Jan. 20, 1959 W. BADOWSKI 2,869,408
TOOL FOR INSERTING PLUGS IN TIRE PUNCTURES
Filed March 26, 1957
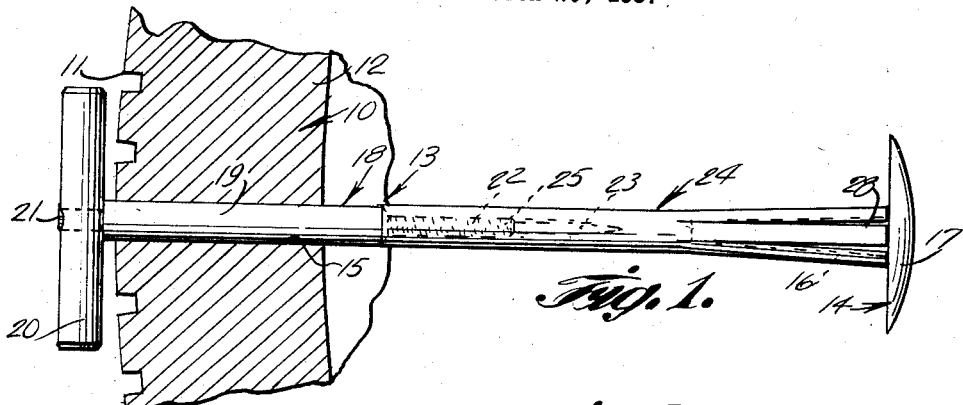
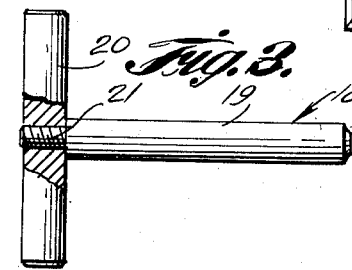
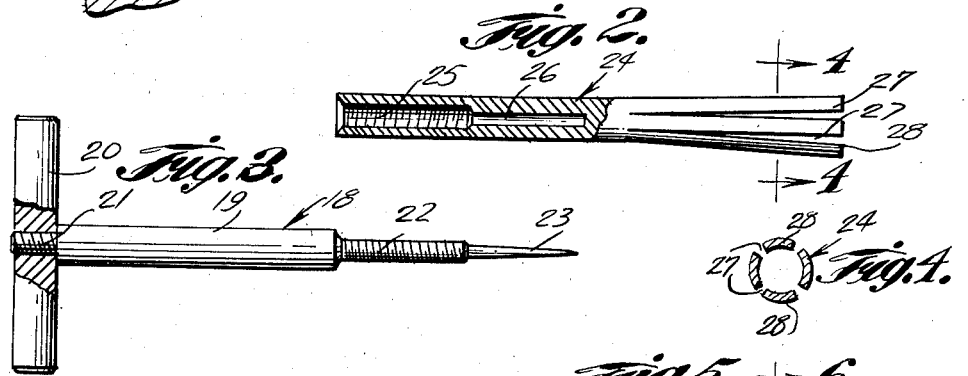
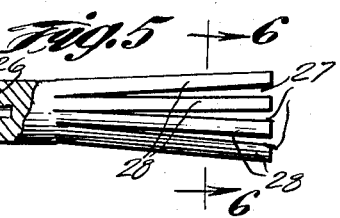
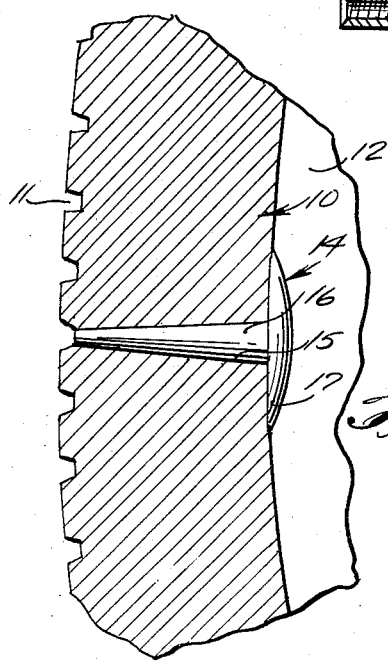
INVENTOR.
Walter Badowski
BY Victor J. Evans & Co.
ATTORNEYS

United States Patent Office 2,869,408
Patented Jan. 20, 1959

2,869,408

TOOL FOR INSERTING PLUGS IN TIRE PUNCTURES

Walter Badowski, Roxbury, Mass.

Application March 26, 1957, Serial No. 648,547

1 Claim. (Cl. 81—15.7)

This invention relates to a tire repair tool.

The object of the invention is to provide a tool which is especially suitable for use in repairing tubeless tires.

Another object of the invention is to provide a tool which is adapted to be used for applying caps to punctures in tires such as tubeless tires, whereby the job of placing or positioning the cap in the puncture is greatly facilitated.

A further object of the invention is to provide a tire repair tool which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a sectional view showing a portion of a tubeless tire, and illustrating the tool of the present invention being used for positioning a cap in a puncture in the tire.

Figure 2 is an elevational view of the holder which forms part of the tool, with parts broken away and in section.

Figure 3 is an elevational view of the support member which forms part of the tool, and with parts broken away and in section.

Figure 4 is a sectional view taken on the line 4—4 of Figure 2.

Figure 5 is a view similar to Figure 2, but showing the holder in expanded position as when a cap is to be inserted therein.

Figure 6 is a sectional view taken on the line 6—6 of Figure 5.

Figure 7 is a fragmentary sectional view of a portion of a tubeless tire, showing the sealing cap in place in the puncture.

Referring in detail to the drawings, the numeral 10 indicates a portion of a tire such as a tubeless tire which includes the usual outer tread portion 11 and an inner surface 12.

The present invention is directed to a tool which is indicated generally by the numeral 13, and the tool 13 is adapted to be used for applying a cap such as the cap 14 in a puncture or opening 15 in the tire 10. The cap 14 may be made of any suitable material such as rubber, and the cap 14 includes a tapered stem 16 that is adapted to be positioned in the puncture 15, and the cap 14 further includes an enlarged head 17, Figure 7.

The tool 13 of the present invention includes a body member which is indicated generally by the numeral 18, and the body member 18 includes a first cylindrical portion 19, there being a handle 20 arranged transversely with respect to an end of the portion 19 and secured thereto in any suitable manner, as for example by means of a securing element 21. The shank of the body member 18 further includes a second portion 22 which is of smaller diameter than the first portion 19, and the portion 22 is threaded externally, as shown in Figure 3. The second portion 22 has a third portion 23 arranged contiguous thereto, and the third portion 23 tapers to a point.

The tool 13 further includes a holder which is indicated generally by the numeral 24, Figures 2 and 5. The holder 24 is provided with a threaded socket 25 which extends inwardly from one end thereof, and the socket 25 is adapted to threadedly engage or receive the portion 22 of the body member 18. The holder 24 further includes a bore or passageway 26 for receiving therein the pointed end 23 of the body member 18. The other end of the holder 24 is provided with a plurality of spaced apart slots 27 which define therebetween spring fingers 28, and the spring fingers 28 are adapted to receive therebetween the tapered stem 16 of the sealing cap 14.

From the foregoing, it is apparent that there has been provided a tool which will permit tubeless tires to be repaired quickly and easily.

In use, the shoe or tire is removed from the rim, and then the nail is removed from the tire at the point where the puncture occurred and then the body member 18 is inserted through the puncture 15 as far as the body member will go so that the handle 20 is contiguous to the tread portion 11 of the tire 10. Next, the holder 24 is placed on top of the plug or cap 14 so that the stem 16 of the cap is received between the spring fingers 28 and the holder is pushed down onto the plug as far as it will go. Next, cement is applied to the inside of the rubber cap and also along the slots 27 and the mushroom-like cap 14 is permitted to become tacky which takes approximately a minute or so. Then, the holder 24 is placed on the body member 18 and screwed tightly thereon. Next, by pulling on the handle 20, the shank of the body member and the holder 24 will be pulled all the way through the puncture or opening 15 so that the mushroom plug 14 will have its stem 16 extending through the puncture 15 and whereby the head 17 will be flush with the inside surface of the tire 10. If the plug is not flush, a pair of pliers or tweezers can be used to pull on the stem of the plug which will be on the outside of the tire so as to make sure that the head 17 is flush on the inside of the tire. Next, the projecting stem end of the plug is trimmed off by means of a knife or the like, and the stem is trimmed off close to the tire. The repair job is then completed since the air pressure in the tire will force the mushroom plug flush with the inside surface of the tire.

Thus, it will be seen that there has been provided a method of and means for repairing tubeless tires. The modern tubeless tire consists of a tire casing which has a tenacious masticatory compound on the inner surface thereof which serves to seal small tears or punctures without the loss of air or pressure. However, occasionally a puncture is so large in the tire wall that the sealing compound cannot seal the break in the tire so that the tire will hold neither air nor pressure and in such instances it is necessary to have the tire repaired.

Heretofore, rubber mushroom-like caps have been used for sealing breaks in tires, in the same manner as the prior tire patches were used. However, with the mushroom-type cap, it is to be noted that the cap is placed on the inside of the tire and the tip or leg of the cap is drawn through the puncture, the leg or stem of the cap being drawn from the inside of the tire through the casing towards the tread. The cap, having been previously coated with rubber patch cement, sets and then the protruding portion of the cap stem is cut even with the tread.

The insertion of this mushroom cap varies with the particular user or garage repairman. For example some users have pushed the mushroom cap through the puncture until a portion of the cap stem could be grasped from the tread side with tweezers and pulled until the head of the cap rests against the casing. Other users have used a small wire to pull the stem of the cap through the puncture and others have tried using tough twine to force the stem of the plug through the puncture and still others have tried to use an ice pick to push the plug in place and then drawing the cap through the puncture by means of tweezers. It is obvious that all of the above methods have certain defects. For example, in one instance the leg or stem of the mushroom cap must of necessity be of a smaller diameter than would normally seal the break since if it were larger and susceptible of making a good seal, it would be impossible to push this plug manually through the tire casing. When using a piece of wire, the caps may be ruined by cutting the rubber stem and when using twine, the operation is tedious and the twine often pulls loose and the use of the ice pick has been found to be slow and also causes the puncture to become enlarged.

On the other hand the method and tool of the present invention overcome the aforementioned disadvaantages and the tool consists of the handle 20, the shank of the body member 18, and the holder 24 which is slotted on one end and which is threaded on the other end for receiving the portion 22 of the body member 18.

When using the tool, the fingers 27 are spread apart at the slotted end of the holder 24 and then the stem 16 of the cap 14 is placed in the slotted opening and the cap is moved down into the slotted opening as far as it will go until the head 17 rests against the ends of the prongs or fingers 28. Next, the protective membrane is removed from the cap and the flat surface of the cap is coated with rubber adhesive. At the same time, the rubber adhesive or cement is placed in the slots 27 to coat the rubber stem and the coated cap and holder 24 are put aside for a few minutes to permit the adhesive to set and become tacky.

Next, the tire is placed upon a bench and the inner portion of the tire about the puncture 15 is rasped so as to create a clean rough surface. The shank of the body portion 18 is then forced through the casing puncture 15 from the tread side 11 inwardly until all of the threaded portion 22 protrudes into the tire. Rubber adhesive or cement is then applied to the roughened portion of the tire about a puncture or break and this cement is permitted to become tacky.

With the pointed portion 23 of the tool extending through the casing, the holder 24 is threaded onto the portion 22 and then the handle 20 is grasped and slowly drawn out and away from the tire and this will cause the mushroom cap 14 to be drawn to a snug position of contact with the coated portion of the tire. When the repair man or serivec man observes that the cap is in this position, the entire tool is drawn out of the tire and this results in the stem and mushroom cap being snugly in place. When larger patches are present, it is expedient to hold the cap against the tire wall until a good bond is made. The portion of the plug stem which protrudes beyond the tread is cut off in any suitable manner.

The advantages of the tool of the present invention are as follows. The tool can be made in several sizes to fit rubber mushroom cap patches of different sizes and shapes. The tool can be forced through a puncture or break without increasing the size of the puncture regardless of how ragged or irregular the break may be, and the device does not require threading through of a wire or twine. The prongs or fingers 27 encase the foot or stem 16 of the plug or cap 14 with the result that the rubber of the stem 16 and of the tire do not come into contact. Thus, the stem can be completely drawn into the casing without the friction of rubber on rubber and this has the further advantage of permitting the operator to draw through the break a rubber stem or foot which is much larger in size than can be done under present methods.

When the under side of the cap is in place, the tool is drawn out so as to cause the stem or foot to be drawn up snugly to the inner side of the tire. This creates the same effect in one operation as the drawing out of the stem in the tread side with tweezers. Furthermore, it is not necessary to use wires to force through the stem nor is there any twine to pull free. There is no need to thread the wire or twine through the tire itself. The parts of the tool such as the holder can be made in different sizes and shapes to conform with the shape or size of the tear of puncture in the tire and with the present invention, much time can be saved over the methods now in use.

To sum up, the steps in repairing the tire with the tool of the present invention are as follows. First, the rubber mushroom stem is inserted into the slotted section of the holder 24, and then the protective covering on the underside of the cap is removed and adhesive is applied thereon and upon the stem 16 through the slots 27 in the holder and this adhesive is permitted to become tacky. Next, the inner surface of the tube about the puncture or break is roughened and coated with rubber adhesive and after this adhesive becomes tacky, the body member 18 has its shank forced through the casing from the tread side inwardly until the complete threaded portion 22 is exposed. Then, the holder 24 is placed on the threaded portion 22 of the body member 18 and tightened into place and then the mushroom cap is drawn up to meet the inner side of the tire and then the tool is withdrawn. Then, the cap of the patch is pressed against the inner side of the tire until a firm bond is made and finally the protruding portion of the stem is cut off over the tread of the tire.

I claim:

In a tire repair tool, a body member including a shank comprising a first portion of cylindrical shape, a handle arranged transversely with respect to an end of the cylindrical portion of the shank and secured thereto, said shank further including a second portion of smaller diameter than said first portion and said second portion being threaded externally, a third portion extending from said second portion and said third portion tapering to a point, a holder having one end portion of cylindrical shape and of the same external diameter as the first portion of said shank and including a threaded inner socket for threadedly receiving the second portion of said shank, there being a bore in said holder for receiving the tapered third portion of the shank, the other end of said holder being provided with a plurality of spaced apart slots defining spring fingers therebetween for receiving therebetween the stem of a cap.

References Cited in the file of this patent

UNITED STATES PATENTS

| | | |
|---|---|---|
| 1,545,831 | Hirst | July 14, 1925 |
| 1,570,298 | Fisher | Jan. 19, 1926 |
| 1,596,822 | Fuchs | Aug. 17, 1926 |
| 1,657,810 | Watson | Jan. 31, 1928 |
| 1,754,624 | Griffits | Apr. 15, 1930 |
| 2,727,554 | Westfall | Dec. 20, 1955 |